Oct. 11, 1966 — S. D. ROBINS — 3,278,002
BELT TRAINING APPARATUS
Filed March 17, 1965 — 2 Sheets-Sheet 1
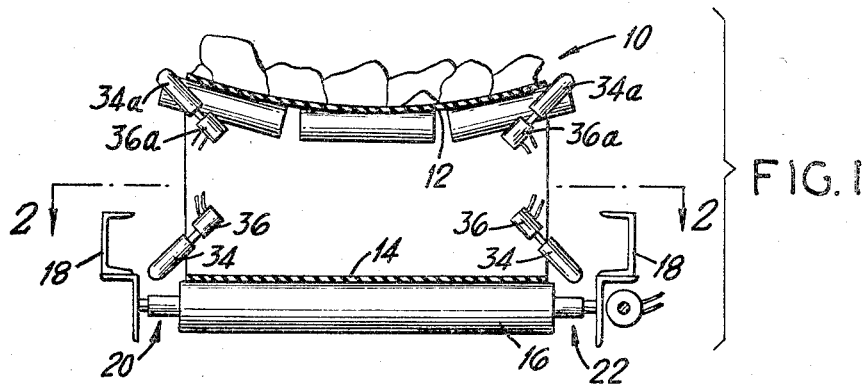
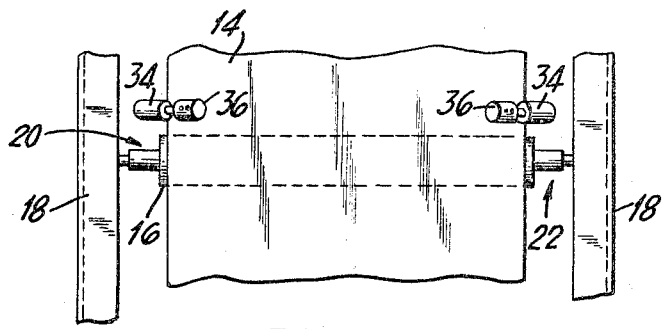
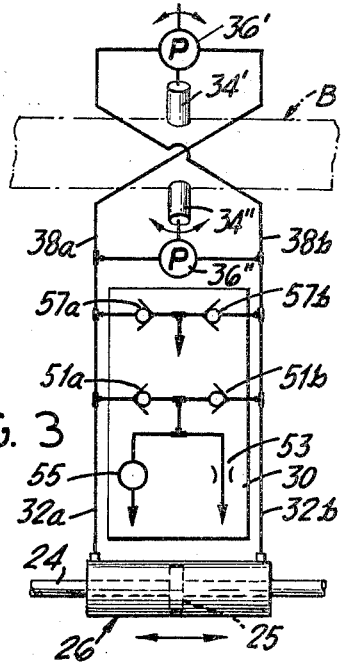
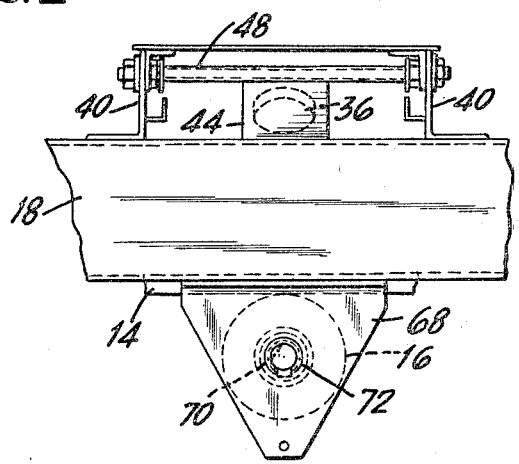
INVENTOR.
SAMUEL DAVIS ROBINS
BY
Leonard H. King
ATTORNEY.

Oct. 11, 1966  S. D. ROBINS  3,278,002
BELT TRAINING APPARATUS
Filed March 17, 1965  2 Sheets-Sheet 2
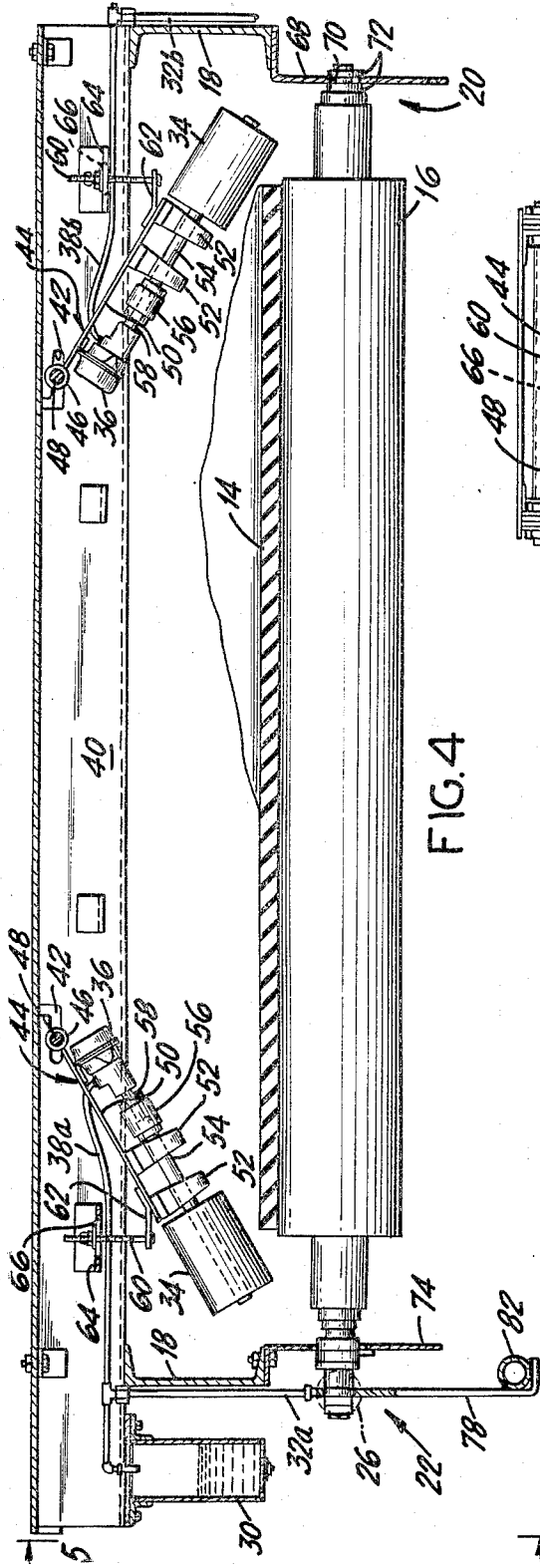
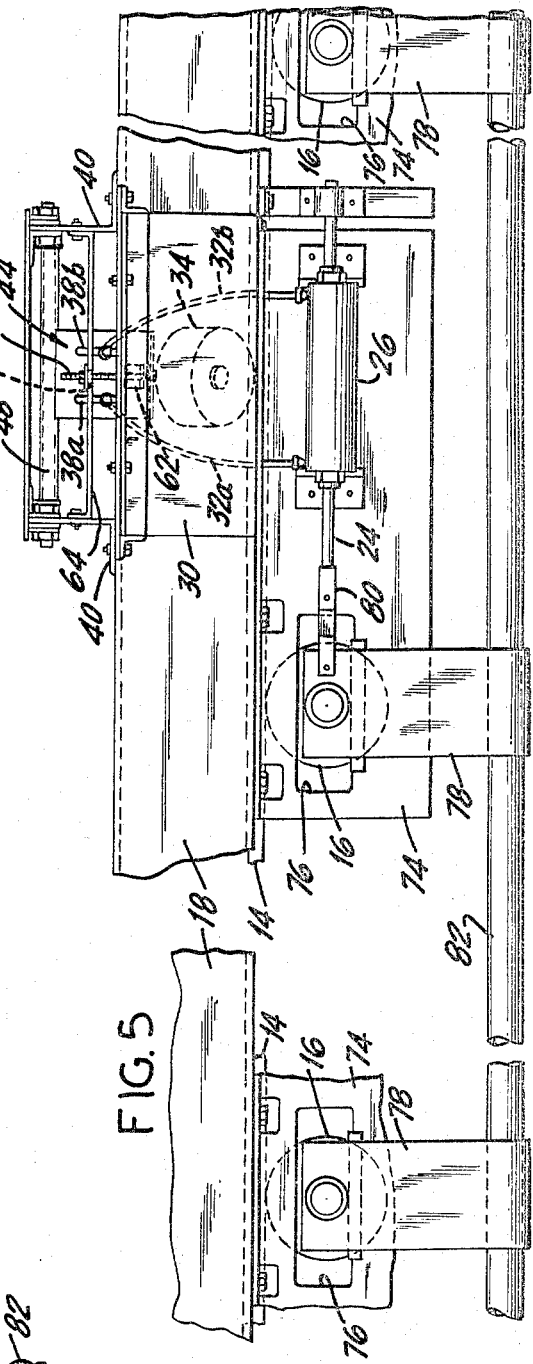
INVENTOR.
SAMUEL DAVIS ROBINS
BY
Leonard H. King
ATTORNEY.

United States Patent Office 3,278,002
Patented Oct. 11, 1966

3,278,002
BELT TRAINING APPARATUS
Samuel Davis Robins, Lawrence, N.Y., assignor to Litton Industries, Inc., a corporation of Delaware
Filed Mar. 17, 1965, Ser. No. 440,549
41 Claims. (Cl. 198—202)

This invention relates generally to belt type conveyors and more particularly to apparatus to maintain the belt of the conveyor centered with respect to its support frame.

The present invention relates to a new system for training conveyor belts and provides a nonhunting, automatically reversible system that requires no special "trainers" and may employ standard belt supporting idlers.

Advantageously, the conveyor belt should be centralized between its support frames for optimum operation. Deviation beyond prescribed limits, from a central position, will cause excessive wear in the belt edge and associated apparatus.

For a better understanding of the environment of the present invention, a typical installation may be considered. By way of example, a conveyor system for handling ore which is one-half mile long will have an endless belt approximately one mile long. The cost of the belt alone may be as much as $500,000. Should the belt be laterally displaced while it is running and come into contact with a support member, it will rapidly be worn and if not repaired, the belt will deteriorate. To repair such a belt, a spare section must be provided at a considerable additional expense. The extra length of belt is typically ⅙ the total length for a belt of this size. A section of the damaged belt is cut out and the spare section spliced and vulcanized in place. The removed section is then returned to the factory for repairs. This process must be repeated six times in order to replace the entire belt. Because of the size and weight of even the ⅙ section of the belt, a flat bed trailer truck must be employed for transportation. From the foregoing, it will be quite evident that it is imperative to minimize belt wear. In addition to actual material, labor and transportation costs, which may run upwards of $100,000, a considerable amount of money is lost by the operator because of system shutdown which may affect operation of a large plant.

The new arrangement, while simple, is so different from previous training systems that a detailed description is neccessary to properly compare the new system with the prior art. In principle, the system as applied to both the troughing and return runs of a conveyor is the same, so for descriptive purposes, only the application to the return run is chosen.

Only a minimum number of parts are needed to adapt the present invention to existing installations. The apparatus is readily assembled from commercially available standard gear or vane-type pumps and hydraulic cylinders resulting in comparatively low cost.

A pair of sensing rollers are angularly positioned near both longitudinal sides of the load and return belt and are adapted to sense or feel only a predetermined excessive lateral motion of the belt. As will be explained more fully hereinafter, these sensing rollers, through a hydraulic system, serve to relocate at least one of the transverse idler rollers supporting the conveyor belt. Accordingly, unless the sensing rollers are activated by the edge of an off center belt, the idler roller associated therewith will not be displaced. Stated another way, the belt centering means is hydraulically locked when the belt is in proper position or within a range of predetermined positions. The means to return the belt cannot be activated until the belt actually strays a given amount.

When the return belt moves sufficiently off center in either lateral direction, the edge thereof engages and frictionally drives one of the sensing rollers. In turn, the sensing roller drives a pump which sends hydraulic fluid to one of two sides of a cylinder. The piston of the cylinder is thereby actuated and serves to displace one end of the idler roller in a direction substantially parallel to the movement of the belt. In effect, the movement of the idler roller serves to reposition the belt thereon since the idler roller is restrained axially and is pivoted in a plane parallel to the belt plane at its free end opposite the hydraulic cylinder.

One of the aforementioned hydraulic cylinders may be associated, by means of suitable linkages, with two, three, or four adjacent idler rollers. This arrangement provides quicker relocation of the belt and also reduces the total number of components required. It has been found that a double acting hydraulic cylinder, having a six-inch stroke, is sufficient for the intended purpose. The free end of the idler roller need not be displaced more than three inches in either direction.

A gear or vane type pump driven by the sensing rollers is admirably suited to the present invention. The particular type of pump employed makes it unnecessary to use additional valves since the pump works equally well in either direction. When the direction of rotation of the drive shaft is changed, the suction side of the pump becomes the outlet side. When the drive shaft is at rest, hydraulic fluid cannot pass through the pump. Thus, regardless of the direction of belt travel, the pumps will operate efficiently to center the belt.

Care has been taken in the present invention to avoid placing any additional or extraneous load on the moving belt. When the belt is centrally located in its proper operating position, the sensing rollers are clear of the belt edges. The sensing rollers, which are pivotally mounted and arranged at an angle to the horizontal plane of the belt, will only engage the edge of the belt when it wanders laterally. Also, because the sensing rollers are pivotally mounted, the pressure exerted on the edge of the belt is less than the weight of the sensing roller assembly. This pressure is in the order of only two pounds so that it will be seen to be negligible and not likely to impart any substantial amount of additional drag to the belt.

As a result of the manner in which the sensing rollers are supported and the high mechanical advantage of the system, a minimum of belt force is required to actuate the sensing rollers and hence the cylinders.

Several other features of practical importance are present in the instant invention. Once the return belt is repositioned, the idler rollers will remain in their new position at a fixed angle of skew. They will remain so positioned until the belt strays once again and reengages the sensing rollers. Because of the hydraulic locking effect, the present device is immune to extraneous forces that tend to skew devices of the prior art.

Additionally, the present invention includes a nonhunting feature. A predetermined central zone is established within which the belt may stray laterally. The present invention is sensitive enough to control the limits of this zone to within one inch off of either side of dead center. When the return belt is within the acceptable limits, no correcting skew is imparted to the idler roller. When the belt strays beyond either side limit, the idler roller is skewed to reposition the belt. Hence overcontrolling and hunting of the conveyor belt is avoided.

Accordingly, it is an object of the present invention to provide improved means to train a conveyor belt to compensate for lateral movement of the belt in either of two lateral directions.

An additional object is to provide low cost belt centering means that may be applied to existing installations.

A further object is to provide an improved belt training means that will function for either direction of conveyor motion.

Still another object is to provide means to sense lateral movement of a moving conveyor belt, said sensing means being arranged so as to add a minimum of pressure to the belt.

A further object is to provide improved conveyor belt centering means that engages the longitudinal edge of the belt when the belt moves laterally from its normal position to derive power for skewing idler rolls.

An additional object is to provide belt centering means for a conveyor, the centering means functioning by skewing at least one belt supporting idler roller.

Another object is to provide means to have the aforementioned skewing action operate on more than one idler roller.

A further object is to sense the lateral movement of the return belt beyond a predetermined central zone of permissible deviation.

Still another object is to provide means to lock the belt movement skewing means once they have been activated to reposition the belt.

An additional object is to provide belt movement sensing means that may be activated with a minimum force and which through large mechanical advantage creates a large enough force to effectively skew the idler rollers.

These and other features, objects and advantages of the invention will, in part, be pointed out with particularity and will, in part, become obvious from the following more detailed description of the invention taken in conjunction with the accompanying drawing which forms an integral part thereof.

In the various figures of the drawing, like reference characters designate like parts.

In the drawing:

FIG. 1 is a schematic cross sectional elevation view of the apparatus comprising the present invention;

FIG. 2 is a schematic plan view taken along line 2—2 of FIG 1;

FIG. 3 is a schematic digaram of the hydraulic system employed in conjunction with the present invention;

FIG. 4 is an enlarged detail cross sectional view of the conveyor return belt illustrating the cooperative relationship of the apparatus of the present invention;

FIG. 5 is a side elevation view taken along line 5—5 of FIG. 4; and

FIG. 6 is an end elevation view illustrating the pivotal mounting of the idler roller.

Referring now to the drawing, the mode of operation of the present invention will be generally described with respect to FIG. 1—FIG. 3. The particular structure utilized to carry out the preferred embodiment of the invention will be described in detail thereafter.

Endless conveyor belt 10 is comprised of an upper, load carrying portion 12 and a lower return section 14. The lower return section 14 of the conveyor belt is supported by a plurality of transverse, substantially parallel idler rollers 16 which are journaled at the ends thereof in structure carried by conveyor frame members 18.

Idler roller 16 is pivotally mounted at one end 20 so that the opposite end 22 thereof is arcuately movable and yet the roller is restrained from axial movement. The end 22 of roller 16 is actuatable by the linearly movable shaft 24 coupled to piston 25 of double acting hydraulic cylinder 26 (FIG. 5). A common reservoir 30 (FIGS. 4 and 5) supplies fluid through conduit 32a or 32b to one side or the other of the cylinder depending upon the lateral directions in which belt 14 wanders.

A pair of pivoted sensing rollers 34 are angularly positioned over the longitudinal edges of belt 14. When the belt is properly centered with respect to the fixed conveyor support members, rollers 34 are out of engagement with the belt edges. However, when the belt strays laterally, for example, under the influence of uneven loading of upper belt section 12, one longitudinally moving edge of the belt will frictionally engage and rotate one of the sensing rollers. Through suitable couplings, each roller 34 is connected to its own pump 36 of the gear or vane type. Conduits 38a and 38b extend between each pump and the cylinder. It will be seen then that as one pump or the other is activated by one of the sensing rollers, hydraulic fluid will be introduced into one side of the cylinder. The free end of the idler roller will be displaced in one direction or the other depending upon the direction of piston movement. For a typical installation, a piston displacement of three inches in either direction is sufficient to skew the idler roller and cause the belt to recenter itself.

Referring now to FIG. 4 and FIG. 5, it will be seen that a transverse support member 40 extends between and is secured, as by welding, to longitudinal conveyor frame members 18. Support member 40 is positioned between the upper and lower sections of endless conveyor belt 10. A pair of apertures 42 are formed near the top of support member 40 and inboard the ends thereof. To aid in the adjustability of the system, apertures 42 are in the form of elongated slots.

Bracket 44 is pivotally and adjustably mounted on transverse support member 40 by means of a tubular standoff 46 and a stud 48. Shelf 50, integral with standoff 46, supports sensing roller 34 on the underside thereof and further serves to support pump 36. Pillow blocks 52 also secured to shelf 50 rotatably support shaft 54 of the sensing roller. Sleeve member 56 couples shaft 54 of the sensing roller to shaft 58 of pump 36. The sensing roller is laterally positioned by the movement stud 48 within horizontally elongated aperture 42. The sensing roller is vertically adjusted by means of a hanger bolt 60 extending between bracket 62 disposed on the top surface of shelf 50 and a bracket 64 depending outwardly from transverse support member 40. Thus it will be seen that the position of the sensing roller with respect to the longitudinal edge of the belt may be easily adjusted to the desired position. Furthermore, the sensing roller does not oppose the wandering of the belt. The only pressure exerted by the sensing roller is a component of its own weight and the other elements associated therewith. Both sensing rollers are accurately located by their own weight in the lowermost position desired but are free to be moved upwardly by any undulating motion of the return belt because hanger bolt 60 passes through an oversized slot 66 in bracket 64.

As seen in FIG. 4 and FIG. 6, idler roll 16 is pivotally supported at its righthand end 20 in a right angle support bracket 68 secured to and depending downwardly from conveyor frame member 18. Bracket 68 is provided with a keyholed aperture 70 dimensioned such that it permits the reduced diameter end of idler roll 16 to swing in a horizontal plane. Enlarged diameters 72 on the righthand end of idler roll 16 cooperate with the keyhole aperture to prevent axial motion of the idler roll.

At its opposite or lefthand end, as seen in FIG. 4, idler roller 16 is supported in a bearing plate 74 which is rigidly secured to conveyor frame member 18. Fixed bearing plate 74 is provided with a horizontal slot 76 tht permits a skewing motion of idler roller 16 in the horizontal plane. Fixed bearing plate 74 also serves as mounting means for bidirectional cylinder 26. To provide means to skew the idler rollers, a plate 78 is secured to the free end thereof and a linkage 80 is used to connect the cylinder piston to the plate. Thus when the sensing roller 34 frictionally engages the displaced edge of belt section 14, pump 36 is driven to deliver hydraulic fluid from reservoir 30 to one side of cylinder 26. The cylinder piston 25 is thereby actuated to skew end 22 of idler roller 16. Similar apparatus is employed to detect straying of belt 14 in the opposite transverse direction. However, when the sensing roller on the opposed side of the belt is energized, hydraulic fluid is delivered to the opposite side of the cylinder and the piston thereof operates in the opposite direction to that hereinabove described. The effect, of course, is to skew the idler roller in the opposite direction in order to correct for lateral belt movement.

Referring now to FIG. 3, there is shown a simplified hydraulic diagram. Assuming belt B moves from left to right, and the edge thereof comes into engagement with roller 34′, the actuation of the roller will cause pump 36′ to pump fluid through conduit 38a and 32a to the upstream or intake side of the cylinder 26. The piston 25 and shaft 24 will move towards the right and, as the piston moves, the fluid will be forced out of the righthand or downstream section of cylinder 26 through conduit 32b and 38b to the intake of pump 36′. Excess fluid will flow through check valve 51 and orifice 53 located in supply tank 30. The restricted orifice 53 serves to maintain back pressure so that fluid will flow to the intake side of pump 36′. Check valves 57a and 57b admit fluid from the tank 30 to the system upon demand from the pump.

As the piston reaches the extreme righthand side, further fluid cannot be accommodated in the cylinder. As pressure builds up, fluid passes through check valve 51a and orifice 53 to tank 30. If pressure becomes excessive, normally closed pressure relief valve 55 opens to bypass the hydraulic fluid into the tank.

When the belt B moves in the opposite direction, that is from right to left, the direction of rotation of roller 34′ will therefore be in the opposite angular direction when it comes into contact with the belt. Pump 36′ will direct fluid to the opposite side of cylinder 26 so that piston 25 and shaft 24 move in the opposite direction. Thus the transverse idler roller will be skewed at an opposite angle to compensate for the straying of the belt. It should be noted that the angle of skew is a function of longitudinal movement of the belt. With the belt moving from left to right, the idler roller must be skewed in one direction and with the belt moving from right to left, the idler roller must be skewed in the opposite direction. While the foregoing description is based on the belt straying laterally to come into contact with roller 34′, it is obvious that similar fluid flows and valve operation will take place when the belt wanders laterally into engagement with roller 34″. Accordingly, the mode of operation need not be repeated.

The various valves, orifices, etc. may be located in the hydraulic fluid tank so that minor leaks are of no consequence. Only two external connections to the tank are required, one for each pump.

While the foregoing description pertains to skewing of a single idler roller, it is to be understood that it is within the scope of the present invention to simultaneously and selectively skew a group of two or more such rollers in either one of two directions. Additional sensing rollers, pumps, hydraulic cylinders or hydraulic fluid reservoirs are not required for the group. Each of the idler rollers, for example, the three illustrated in FIG. 5, are provided with a plate 78 at the free end 22 thereof. A connecting rod 82 is used to join the lower ends of the plate so that when hydraulic fluid is supplied to either side of the cylinder, the piston thereof will displace one of the plates 78. In the embodiment illustrated, linkage 80 connects the cylinder piston to the central plate.

Other like skewing devices may be provided for additional groups of rollers spaced about 120 feet apart along the conveyor.

While the invention has been described as applied to the return belt, it may be applied to the load carrying belt in like fashion. In FIG. 1, there is shown sensing rolls 34a and pumps 36a arranged to sense deviation of the load carrying belt. It is to be noted that both sensing and correction means are conveniently located in the shielded area between the clean faces of the belt.

Important operating characteristics not hitherto achieved by the prior art are provided herein, as follows:

(1) *Nonhunting characteristic.*—Because of the neutral center zone in which neither sensing roller is in contact and therefore must remain stationary, the gear pumps act as closed valves and lock the idler rolls in immovable position thereby preventing overcontrol and hunting. Also, because of the high mechanical advantage (each pump roller must make hundreds of revolutions to move the connecting rod one inch) a very controlled and deliberate skew adjustment is made with none of the erratic oscillations characteristic of conventional center pivoted trainers.

(2) *Insensitivity to "roll buildup," uneven wear, or any other extraneous effects.*—Either buildup of foreign material sticking to the usual pivoted trainer roll, which increases its diameter, or uneven wear, which reduces its diameter, will cause the usual trainer to skew one way or the other causing detraining rather than training of the belt. This problem is eliminated with the new trainer. Because it is self-locked in any instantaneous position and cannot skew as a result of any extraneous forces but only in response to sensing roller rotations, its correct position is at all times guaranteed. Consequently, the belt always runs true.

(3) *Handles reversible belts.*—This device operates equally well in either direction and provides centering means for reversible conveyors.

(4) *Mutilple training force.*—As every idler carries the same weight of belt, whether it be a skewable trainer or not, it follows that by coupling three idlers together, three times the training force is obtained.

(5) *Low installation cost.*—Training belt conveyors is far less costly by the instant apparatus than by any known existing method. Considering that the idlers already supplied with the conveyor are employed and that many times the training effect is obtained by only the addition of brackets, link bars and the sensing unit, a saving in the cost of equipment is obvious.

There has been disclosed heretofore the best embodiments of the invention presently contemplated and it is to be understood that various changes and modifications may be made by those skilled in the art without departing from the spirit of the invention.

What is claimed is:
1. In a conveyor system having a supporting frame member, idler rollers supported by the frame member, and an endless belt defined by an upper, load carrying run and a lower return run carried by the idler rollers, the improvement for maintaining the belt centered with respect to the frame member while the belt is moving longitudinally, said improvement comprising:
  (a) at least one belt carrying, transverse idler roller pivotally supported on the frame, said roller being arcuately movable relative to the frame about a vertical axis;
  (b) sensing means positioned in proximity to each of the longitudinal edges of at least one run of the conveyor belt, said sensing means being adapted to be actuated by the conveyor belt when the edge thereof proximate said sensing means strays laterally beyond a predetermined position in a direction towards said sensing means;
  (c) pump means responsive to the actuation of said sensing means;
  (d) an actuating cylinder having upstream and downstream sides and a piston linearly movable in opposite directions responsive to said pump means;
  (e) conduit means communicating between said pump means and said cylinder;
  (f) linkage means connecting the piston of said cylinder to said arcuately movable idler roller whereby actuation of said sensing means by a laterally straying edge of the belt will cause the piston of said cylinder to displace said roller through said linkage means; and
  (g) a supply of actuating fluid communicating between said cylinder and said pump.

2. The apparatus of claim 1 including means adapted to divert actuating fluid from the upstream side of said cylinder when the piston of said cylinder is in an extreme position.

3. The apparatus of claim 1 including means adapted to divert actuating fluid from the upstream side of said cylinder when a predetermined pressure is reached.

4. The apparatus of claim 1 including a pressure relief valve disposed in communication with said conduit means intermediate said pump and said cylinder.

5. The apparatus of claim 1 including a tank containing said supply of fluid, there being further included check valves in communication with said conduit means whereby the first of said check valves is arranged to admit to said tank the excess fluid from said conduit means thereby communicating the downstream side of said cylinder to said pump and whereby the second of said check valves is arranged to admit fluid from said tank to said conduit means upon demand from said pump.

6. The apparatus of claim 5 including a normally closed presure relief valve in communication with the first of said check valves, said relief valve being adapted to open above a predetermined pressure whereby the fluid is bypassed into said tank.

7. The apparatus of claim 6 including a restricted orifice in communication with the first of said check valves, said restricted orifice being adapted to maintain back pressure whereby the fluid will flow to the intake side of said pump.

8. The apparatus of claim 7 wherein said check valves, said pressure relief valve and said restricted orifice, are all contained within said tank.

9. The apparatus of claim 1 wherein said sensing means are located proximate the edges of the lower, return run of the conveyor system.

10. The apparatus of claim 1 wherein said sensing means are located proximate the edges of the upper, load carrying run of the conveyor system.

11. The apparatus of claim 1 including a plurality of pivotally mounted transverse idler rollers and means to couple said second mentioned idler rollers to the piston of said cylinder for movement with said first mentioned idler roller.

12. The apparatus of claim 1 including means to support said sensing means below said load carrying run of the belt.

13. The apparatus of claim 12 including means for adjusting the position of said sensing means relative to the belt.

14. The apparatus in accordance with claim 12 wherein said means to support said sensing means comprises:
(a) a transverse member secured to the conveyor frame, said transverse member being provided with a pair of horizontally slotted apertures inboard the ends thereof;
(b) a shelf and tubular standoff having a stud therethrough, said stud rotatably fitting into the aperture whereby said shelf is maintained in a plane substantially at right angles to the vertical plane of said transverse member, said sensing means and said pump means being secured to the undersisde of said shelf; and
(c) a threadably adjustable hanger bolt having one end fixedly secured to said shelf and the other end of said hanger bolt adjustably and movably secured to said transverse member.

15. The apparatus of claim 1 including means to adjustably and pivotably support said sensing means and said pump means over the return run of the belt.

16. The apparatus in accordance with claim 1 wherein said sensing means comprises a roller shaft and a roller mounted on said roller shaft, said roller being positioned to be frictionally engaged by an edge of the belt when the belt drifts beyond a predetermined position, and wherein said pump means is coupled to said roller for actuation thereby.

17. The apparatus in accordance with claim 1 wherein said sensing means is adapted to sense the direction of both lateral and longitudinal movement of said belt.

18. The apparatus in accordance with claim 1 wherein said pump means is bidirectional and responsive to actuation of said sensing means in either of two angularly opposite directions.

19. In a conveyor system having a supporting frame member, idler rollers supported by the frame member, and an endless belt defined by an upper, load carrying section and a lower return section carried by the idler rollers, the improvement for maintaining the belt centered with respect to the frame member, said improvement comprising:
(a) at least one belt carrying transverse idler roller pivotally supported at one end in the frame, the roller being arcuately movable in the frame at its opposite end;
(b) sensing means positioned in proximity to each of the longitudinal edges of the conveyor belt, said sensing means being adapted to be actuated by the conveyor belt when the edge thereof strays laterally beyond a predetermined position;
(c) pump means responsive to the actuation of said sensing means;
(d) an actuating cylinder having a piston linearly movable in opposite directions responsive to said pump means;
(e) conduit means communicating between said pump means and said cylinder;
(f) linkage means connecting the piston of said cylinder to the arcuately movable end of the idler roller; and
(g) a supply of actuating fluid communicating between said cylinder and said pump.

20. The apparatus of claim 19 including means adapted to divert actuating fluid from the upstream side of said cylinder when the piston of said cylinder is in an extreme position.

21. The apparatus of claim 19 including means adapted to divert actuating fluid from the upstream side of said cylinder when a predetermined pressure is reached.

22. The apparatus of claim 19 including a pressure relief valve disposed in communication with said conduit means intermediate said pump and said cylinder.

23. The apparatus of claim 19 including a tank containing said supply of fluid, there being further included check valves in communication with said conduit means whereby the first of said check valves is arranged to admit to said tank the excess fluid from said conduit means thereby communicating the downstream side of said cylinder to said pump and whereby the second of said check valves is arranged to admit fluid from said tank to said conduit means upon demand from said pump.

24. The apparatus of claim 23 including a normally closed pressure relief valve in communication with the first of said check valves, said relief valve being adapted to open above a predetermined pressure whereby the fluid is bypassed into said tank.

25. The apparatus of claim 24 including a restricted orifice in communication with the first of said check valves, said restricted orifice being adapted to maintain back pressure whereby the fluid will flow to the intake side of said pump.

26. The apparatus of claim 25 wherein said check valves, said pressure valve and said restricted orifice, are all contained within said tank.

27. The apparatus in accordance with claim 19 wherein said sensing means comprises a roller shaft and a roller mounted on said roller shaft, said roller being positioned to be frictionally engaged by an edge of the belt when the belt drifts beyond a predetermined position, and wherein said pump means is coupled to said roller for actuation thereby.

28. The apparatus in accordance with claim 19 wherein said sensing means is adapted to sense the direction of both lateral and longitudinal movement of said belt.

29. A conveyor system comprising:
(a) a support frame extending along both longitudinal sides of said conveyor system;
(b) an endless belt comprising an upper load carrying run and a lower return run;
(c) a plurality of transverse idler rollers positioned just below and in frictional contact with said belt, said idler rollers being pivotally supported on said support frame and arcuately movable relative to said support frame about a vertical axis;
(d) sensing means adjustably secured to said support frame, said sensing means being positioned in proximity to each of the longitudinal edges of at least one run of said belt whereby lateral straying of said belt beyond a predetermined distance and in a direction towards said sensing means will actuate said sensing means;
(e) pump means responsive to the actuation of said sensing means;
(f) an actuating cylinder having upstream and downstream sides and a piston linearly movable in two opposite directions;
(g) conduit means extending between and in communication with said pump means and said cylinder;
(h) linkage means connecting the piston of said cylinder to at least one of said idler rollers whereby actuation of said sensing means by a laterally straying edge of said belt will cause the piston of said cylinder to displace said roller through said linkage means; and
(i) a supply of actuating fluid communicating between said pump and said cylinder.

30. The apparatus of claim 29 including means adapted to divert actuating fluid from the upstream side of said cylinder when the piston of said cylinder is in an extreme position.

31. The apparatus of claim 29 including means adapted to divert actuating fluid from the upstream side of said cylinder when a predetermined pressure is reached.

32. The apparatus of claim 29 including a pressure relief valve disposed in communication with said conduit means intermediate said pump and said cylinder.

33. The apparatus of claim 29 including a tank containing said supply of fluid, there being further included check valves in communication with said conduit means whereby the first of said check valves is arranged to admit to said tank the excess fluid from said conduit means thereby communicating the downstream side of said cylinder to said pump and whereby the second of said check valves is arranged to admit fluid from said tank to said conduit means upon demand from said pump.

34. The apparatus of claim 33 including a normally closed pressure relief valve in communication with the first of said check valves, said relief valve being adapted to open above a predetermined pressure whereby the fluid is bypassed into said tank.

35. The apparatus of claim 34 including a restricted orifice in communication with the first of said check valves, said restricted orifice being adapted to maintain back pressure whereby the fluid will flow to the intake side of said pump.

36. The apparatus of claim 35 wherein said check valves, said pressure relief valve and said restricted orifice, are all contained within said tank.

37. The apparatus of claim 29 wherein said sensing means are located proximate the edges of the lower, return run of the conveyor system.

38. The apparatus of claim 29 wherein said sensing means are located proximate the edges of the upper, load carrying run of the conveyor system.

39. The apparatus in accordance with claim 29 wherein said sensing means comprises a roller shaft and a roller mounted on said roller shaft, said roller being positioned to be frictionally engaged by an edge of said belt when said belt drifts beyond a predetermined position, and wherein said pump means is coupled to said roller for actuation thereby.

40. The apparatus of claim 29 wherein said sensing means is adapted to sense the direction of both lateral and longitudinal movement of said belt.

41. The apparatus in accordance with claim 29 wherein said pump means is bidirectional and responsive to actuation of said sensing means in either of two angularly opposite directions.

References Cited by the Examiner

UNITED STATES PATENTS 3,119,535   1/1964   Hoffman _____ 226—23

EVON C. BLUNK, *Primary Examiner.*

E. A. SROKA, *Assistant Examiner.*